United States Patent [19]
Sharpe

[11] Patent Number: 5,619,498
[45] Date of Patent: Apr. 8, 1997

[54] FLAG FIELD-BASED ROUTING MECHANISM FOR FIBER OPTIC TELECOMMUNICATION SYSTEM EMPLOYING STS-BASED TRANSMISSION FORMAT CONTAINING ASYNCHRONOUS TRANSFER MODE CELLS

[75] Inventor: Randall B. Sharpe, Chapel Hill, N.C.

[73] Assignee: Broadband Technologies, Inc., Durham, N.C.

[21] Appl. No.: 512,654

[22] Filed: Aug. 8, 1995

[51] Int. Cl.$^6$ .................................................. H04L 12/56
[52] U.S. Cl. ...................... 370/396; 340/825.52
[58] Field of Search .................... 370/94.1, 94.2, 370/94.3, 60, 60.1, 110.1, 85.13, 85.14, 58.1–58.3, 123, 73, 76; 348/6, 7, 8, 9, 10, 12, 13; 455/4.2, 5.1, 6.1, 6.2, 6.3; 340/825.44, 825.52; 364/724.01, 724.19

[56] References Cited

U.S. PATENT DOCUMENTS

| | | | |
|---|---|---|---|
| 5,081,621 | 1/1992 | Sugimoto | 370/85.13 |
| 5,086,426 | 2/1992 | Tsukakoshi et al. | 370/85.13 |
| 5,150,247 | 9/1992 | Sharpe et al. | 359/135 |
| 5,214,646 | 5/1993 | Yacoby | 370/85.14 |
| 5,450,407 | 9/1995 | Perlman et al. | 370/85.13 |
| 5,481,540 | 1/1996 | Huang | 370/85.13 |

*Primary Examiner*—Douglas W. Olms
*Assistant Examiner*—Ajit Patel
*Attorney, Agent, or Firm*—Charles E. Wands

[57] ABSTRACT

A two-stage cell routing filter mechanism employs a customer premises associated flag bit field in ATM data cells being serially transmitted from a host digital terminal's data transport path through an optical fiber to a downstream optical network unit associated with a plurality of customer premises equipments. The first stage of the cell routing filter is comprised of a look-up table (LUT) and an associated comparator mechanism. The state of each bit of the flag field of an ATM cell preamble will indicate whether or not the ATM cell is intended for the customer premises equipment associated with the bit. A downstream optical network unit contains an associated set of ATM cell filters associated with customer premises equipment. Each customer equipment cell filter examines a given bit position in the flag field portion of each received ATM cell preamble, to see whether the flag field bit of the preamble of the received ATM cell is set to prescribed bit value (e.g. one)—indicating a customer channel request.

8 Claims, 2 Drawing Sheets

FLAG FIELD-BASED ROUTING MECHANISM FOR FIBER OPTIC TELECOMMUNICATION SYSTEM EMPLOYING STS-BASED TRANSMISSION FORMAT CONTAINING ASYNCHRONOUS TRANSFER MODE CELLS

FIELD OF THE INVENTION

The present invention relates in general to fiber optic telecommunication systems in which a multiplicity of subscriber premises, having one or more pieces of telecommunication equipment, such as digital video terminals, are coupled to an optical network interface that terminates a downstream end of a broadband fiber optic transmission highway, the upstream end of which is coupled to a broadband services master site. The invention is particularly directed to a reduced complexity routing mechanism for delivering asynchronous transfer mode message cells, such as those associated with requested television channels, to destination customer premises equipment.

BACKGROUND OF THE INVENTION

As described in U.S. Pat. No. 5,150,247 (hereinafter referred to as the '247 patent), issued Sep. 22, 1992, to R. Sharpe et al, entitled "Fiber Optic Telecommunication System Employing Continuous Downlink, Burst Uplink Transmission Format with Preset Uplink Guard Band," assigned to the assignee of the present application and the disclosure of which is incorporated herein, fiber optic (or fiber-in-the-loop (FITL)) communication systems have been proposed as a broadband replacement for a variety of communication networks, such as traditional 'copper wire' telephony networks and 'add-on' cable television distribution networks (which employ separate, dedicated coax conductor cables).

Unfortunately, the cost of implementing the systems that have been proposed to date for broadband networks is relatively high, due to the fact that such schemes often involve the use of a large number of electro-optic and interconnect components, such as source and detector elements. When added to the cost of optical connectors and splices for the fiber optic links, and the quantity of optical fiber itself in the distribution cable between opposite ends of the link, such a large number of components severely impacts overall system expense. As a result, on a per-subscriber basis, the aggregate cost of the components is a large fraction of the price tag of an overall system, which, in addition to employing two transmitter/receiver pairs per subscriber, customarily uses a separate, dedicated pair of optical fibers within the distribution cable for each subscriber.

To reduce such a costly outlay for fiber optic components needed for the system, one approach has been to design signal processing and communication architectures that can handle a very large number of subscriber lines per unit and employ a highly compressed data format. Unfortunately, such an approach is effectively self-defeating, since, in order to spread out the cost of the fiber optic components over a large number of subscribers, the system architecture becomes highly complex and therefore aggravates rather than alleviates the cost problem.

To solve this shortcoming, the fiber optic telecommunication scheme described in the '247 patent employs a time division multiplex communication scheme that integrates plural television and telephony signals in a continuous time division format in the downstream direction, and integrates channel selection requests and telephony signals from the customer premises equipment in a slotted burst format in the upstream direction.

More particularly, referring to FIG. 1, which diagrammatically illustrates the '247 patent approach, a host digital terminal (HDT) at a master site 10, to which both telephony and multiple channels of video signals are supplied, is linked to a plurality of remote, geographically separated customer premises 40 by means of a fiber optic cable pair 20. Downstream-directed telecommunication messages (containing both telephonic signals, such as those supplied by way of a central office switch 14 via a link 12, and scrambled television channel-representative digital signals 18, supplied via a link 16) are transmitted in a continuous-mode time division multiplex format over a first optical fiber 21 from the host digital terminal at the master site 10 to a downstream-located pedestal 23.

Pedestal 23 includes a multiple fan-out, optical splitter device 26 located at a first common 'split' point on the downlink fiber 21, and multiple feed-in optical combiner device 27 located at a common 'combine' point on a second, uplink fiber 22. Through these fiber coupling connections within the pedestal, the downlink and uplink fiber pair 21, 22 are coupled by respective downlink and uplink fiber links 24, 25 to a plurality of subscriber interface optical network units 30, that service one or more associated customer premises 40 through associated broadband service drops 35.

The respective television channels within downlink-directed, digitally formatted telecommunication signal frames transmitted over the downlink fiber 21 from the master site 10 correspond to those selected in response to subscriber channel requests contained within uplink burst messages that have been transmitted over the uplink fiber 22 from the customer premises equipments. Each downlink message identifies the optical network unit 30 for whom the message is intended and specifies which digital subscriber line packets are directed to it. The recipient optical network unit 30 demultiplexes the contents of the message and routes the respective television channel signals and telephony signals to customer premises equipment (CPE), such as a TV set top decoder 41 associated with television set 43, telephone handset, etc., at the destination site 40.

Upstream-directed, channel request burst transmissions from the customer premises 40 to the master site 10 occur in time division multiple access format. Within preassigned time slots of successive uplink burst cycles, the subscriber sites are also given the opportunity to transmit a digital subscriber line data packet containing samples of telephony signals. Each uplink burst cycle may contain additional time slots that are accessible by the subscriber interface sites on a contention basis, for network control and television-related signalling.

To prevent collisions between successive uplink slotted signal bursts, a prescribed guard band is used to separate successive uplink time slots from one another. The nominal duration of the guard band accommodates the longest optical fiber transmission distance difference from the common 'combine' point on the uplink optical fiber and the various subscriber interface sites.

Now although the communication scheme described in the '247 patent offers a significant improvement over previously proposed broadband systems, the continuous time division multiplex format it uses for downstream-directed messages, and the slotted burst upstream format employed for upstream-directed messages may not necessarily be preferred by all service providers. Indeed, since the inception of the '247 scheme, the broadband communications industry has devised internationally accepted standards that are well suited for the transport of a wide variety of data types, in particular synchronous optical network transport stream (STS)-based transmissions, in which asynchronous transfer mode (ATM) data cells are conveyed, while still allowing for the use of a slotted bus return channel from the customer premises equipment.

With this end in mind, co-pending patent application Ser. No. 08/383,984, (hereinafter referred to as the '984 application), filed Feb. 6, 1995, by R. Sharpe et al, entitled "Point-to-Multipoint Broadband Services Drop with Multiple Time Slot Return Channel for Customer Premises Equipment Served by Fiber Optic Telecommunication System Employing STS-based Transmission Format Containing Asynchronous Transfer Mode Cells," assigned to the assignee of the present application and the disclosure of which is also herein incorporated, describes a modification of the system described in the '247 to accommodate the use of such communication protocols. Specifically, the '984 application describes the use of an ATM standard, in which STS-based signals are broadcast to a plurality of customer premises equipments, with a selected portion of an STS-based signal employed by an optical network unit being used to generate a timing reference, through which associated customer premises equipments along a drop are provided with uplink burst timeslot assignment. The transport overhead portion of an STS-1 frame is followed by a synchronous payload envelope (SPE), with ATM transport standard cells encapsulated in the SPE.

The optical network unit provides for an ATM cell-embedded STS signalling format. The downlink transceiver end of the optical network unit, which is interfaced with an optical receiver coupled to the downlink fiber link from the pedestal, is applied to a demultiplexer that demultiplexes a single telephony/signalling channel into a telephony/signalling demultiplexer portion of a mux/demux unit and a plurality (e.g. twenty-four) video channels to a standard ATM interface.

The particular video channels being transported over the fiber correspond to channel requests from customer premises equipment served by the system. To direct selected (customer-requested) ones of a plurality of N input channels provided at the upstream end of the link onto selected ones of a plurality of M output channel slots (associated with the number of customers served by the system) transported in the downstream direction to the customer sites served by the system, an N×M multiplexer may be installed at the upstream site. As described in the '247 patent, such an N×M multiplexer is coupled to receive a large number (e.g. sixty-four) of parallel supplied channel inputs and, in response to control signals that are based upon downstream customer requests, directs one or more of those parallel inputs to one or more of the output channel slots for delivery to a customer site.

Now, for a large market share television program, such as the Super Bowl, where a significant number of customer sites can be expected to request the same channel/program, the input of the N×M multiplexer receiving that (Super Bowl) channel will be repetitiously steered or routed to a large number of output channel time slots, thereby using a large portion of bandwidth for transport of the same program. In addition, regardless of which channels are to be transported, the use of such an N×M multiplexer at the upstream end of the link, and an associated demultiplexer at the downstream end of the link require an addressing scheme indicating which customer equipment has sourced a channel request (and to whom the requested channel is to be transported), as well as steering the correct channel to the customer.

SUMMARY OF THE INVENTION

In accordance with the present invention, there is provided a reduced complexity (video channel) cell routing mechanism, which is readily accommodated in the ATM data cells of the communication scheme described in the above-referenced '984 application, and which not only obviates the need for an N×M multiplexer and associated steering control circuitry therefor, but reduces its redundancy of operation and therefore increases the available bandwidth usage of the link.

Pursuant to the present invention, rather than provide an N×M multiplexer, which has requires a large number of input ports sufficient to accommodate all of the available video input channels (any one of which may be requested by any of the downstream customers), and a large number of output ports corresponding to the number of customer premises served by the link, channel selection is provided at the host digital terminal by means of a single bit-based 'routing filter' that is coupled to a high speed serial bus of the host digital terminal's backplane, onto which successive ATM cells are successively asserted for transmission to one or more downstream customer premises sites.

The routing filter in the host digital terminal is disposed in the data transport path feeding an optical fiber serving a plurality of customer sites, and is comprised of a look-up table (LUT) and an associated comparator mechanism. The LUT has a number of entries sufficient to accommodate the number of simultaneous channels delivered to customer premises served by the system. In response to receipt of upstream directed channel request messages from the customer sites, the (customer premises-associated) entries of the LUT are selectively loaded by the host terminal's processor with the addresses of those channels.

As successive ATM cells are asserted onto the host digital terminal's backplane, the address portion of the header of an ATM data cell is compared with the addresses in the LUT to determine which customer premises has requested the channel (ATM cell) being examined. When a match is found, the control processor sets to a given binary state (e.g. a '1' bit) one or more bits of the flag bit field (of the ATM cell preamble) that are associated with customer sites requesting that channel.

The width (number of bits) of the flag field corresponds to the number of customer premises. Thus, to accommodate sixty-four customer sites, for example, the flag field must be at least sixty-four bits wide.

The state of each bit of the flag field of the ATM cell preamble will therefore indicate whether or not that ATM cell is intended for the customer premises associated with the bit. Namely, for any customer premises not requesting a given cell, the customer's associated bit position in the flag field of that channel's ATM cell preamble will be set to a first binary state (e.g. zero). On the other hand, for any customer premises that has requested the cell, the customer's associated bit in the flag field of the channel's ATM cell preamble will be set to a second binary state (e.g. one).

As successively asserted ATM cells are processed through the routing filter in the manner described above, they are coupled through a rate elastic buffer, for rate matching, and then serialized out over the optical fiber to downstream customer premises equipments served by that fiber. A downstream optical network unit (ONU) associated with one or more customer premises equipments contains an associated set of ATM cell filters that are coupled to the output of the ONU's opto-electronic receiver unit.

Each customer equipment cell filter, which may be readily configured as a first-in, first-out (FIFO) register, needs only to examine a given bit position in the flag field portion of each received ATM cell. In particular, a respective cell filter within the ONU looks to see whether the flag field bit of the preamble of received ATM cell is set to prescribed bit value (e.g. one) —indicating a customer channel request. If the flag bit is set to the prescribed bit value associated with a customer program request (e.g. a '1' bit), the ATM cell is allowed to pass through the cell filter and is coupled to an output port for delivery to the customer premises equipment. If the flag bit has not been set to the prescribed bit value, the ATM cell is not allowed to pass through the cell filter, so that it is not coupled to the filter's output port.

Thus, unlike a system employing an N input, M output multiplexer, which transports a separate data packet over the link for each customer channel request, in accordance with the routing filter mechanism of the present invention, each ATM cell includes the above-described routing flag field as part of its preamble, so that each ATM cell needs to be transmitted only once, regardless of the number of customer requests. The states of the bits of the flag field of the routing preamble of a respective ATM cell determine which customer equipments are to receive that cell. Thus, for a high demand television program, such as the Super Bowl, where it can be expected that most of the bits of the flag field will be set to a request state ('1') for 'Super Bowl' ATM cells, the bandwidth occupancy of the link will be significantly reduced, as the needs of numerous customers can be satisfied by the transmission of only a single (Super Bowl-associated) ATM channel over the link.

BRIEF DESCRIPTION OF THE DRAWINGS

FIG. 3 shows the flag field pre-inserted to an ATM cell header.

DETAILED DESCRIPTION

Figure 1:
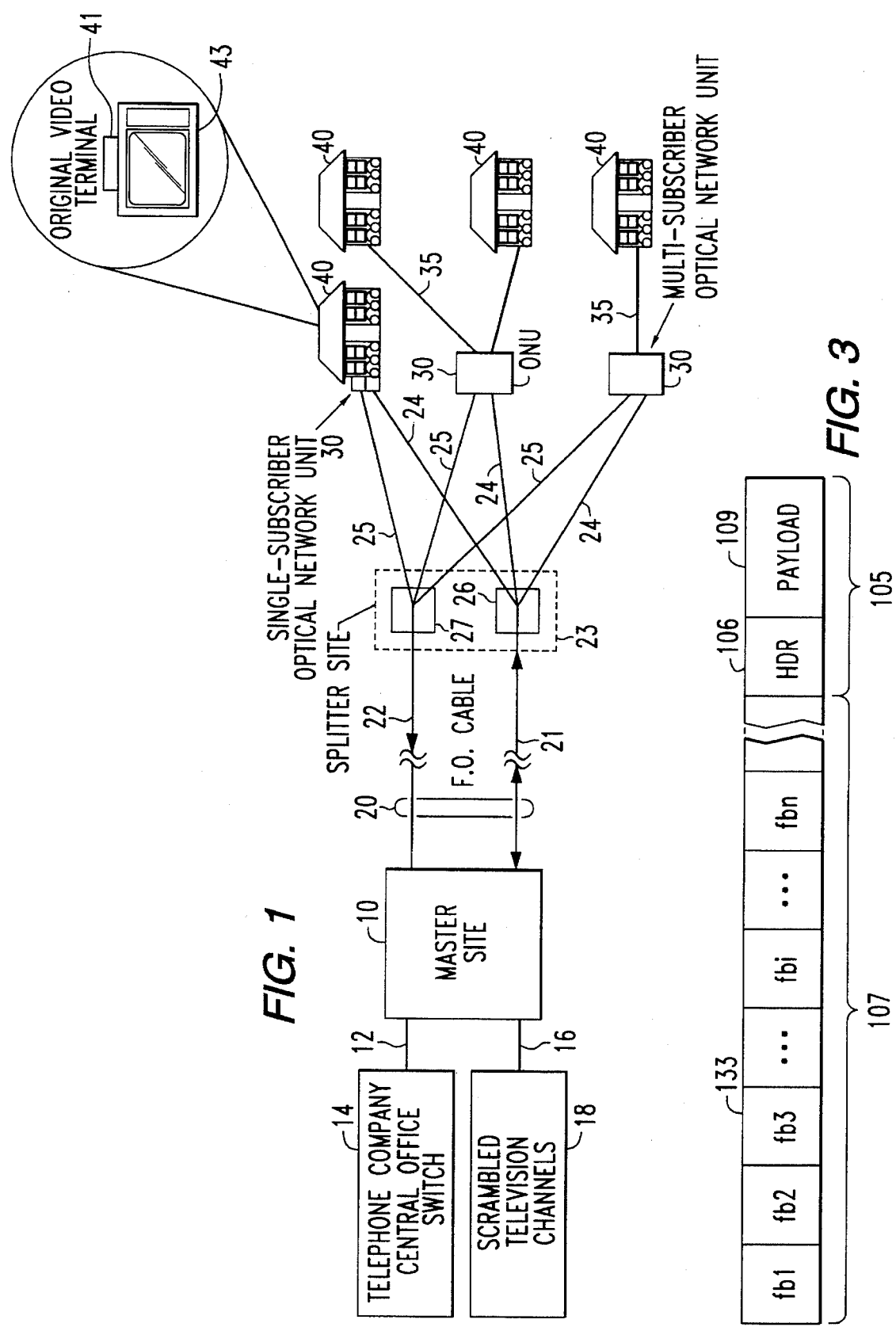
FIG. 1 diagrammatically illustrates a time division multiplex communication scheme described in the above-referenced '247 patent, which integrates plural television and telephony signals in a continuous time division format for transmission over a fiber optic cable to downstream customer premises equipment.

Before describing in detail ATM cell routing mechanism of the present invention, it should be observed that the invention resides primarily in what is effectively a prescribed set of conventional telecommunication signalling hardware components and an attendant supervisory microprocessor therefor. Consequently, the configuration of such components and the manner in which they are interfaced with other communication equipment of the telephone network have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to illustrate the major components of the system in a convenient functional grouping, whereby the present invention may be more readily understood.

Figure 2:
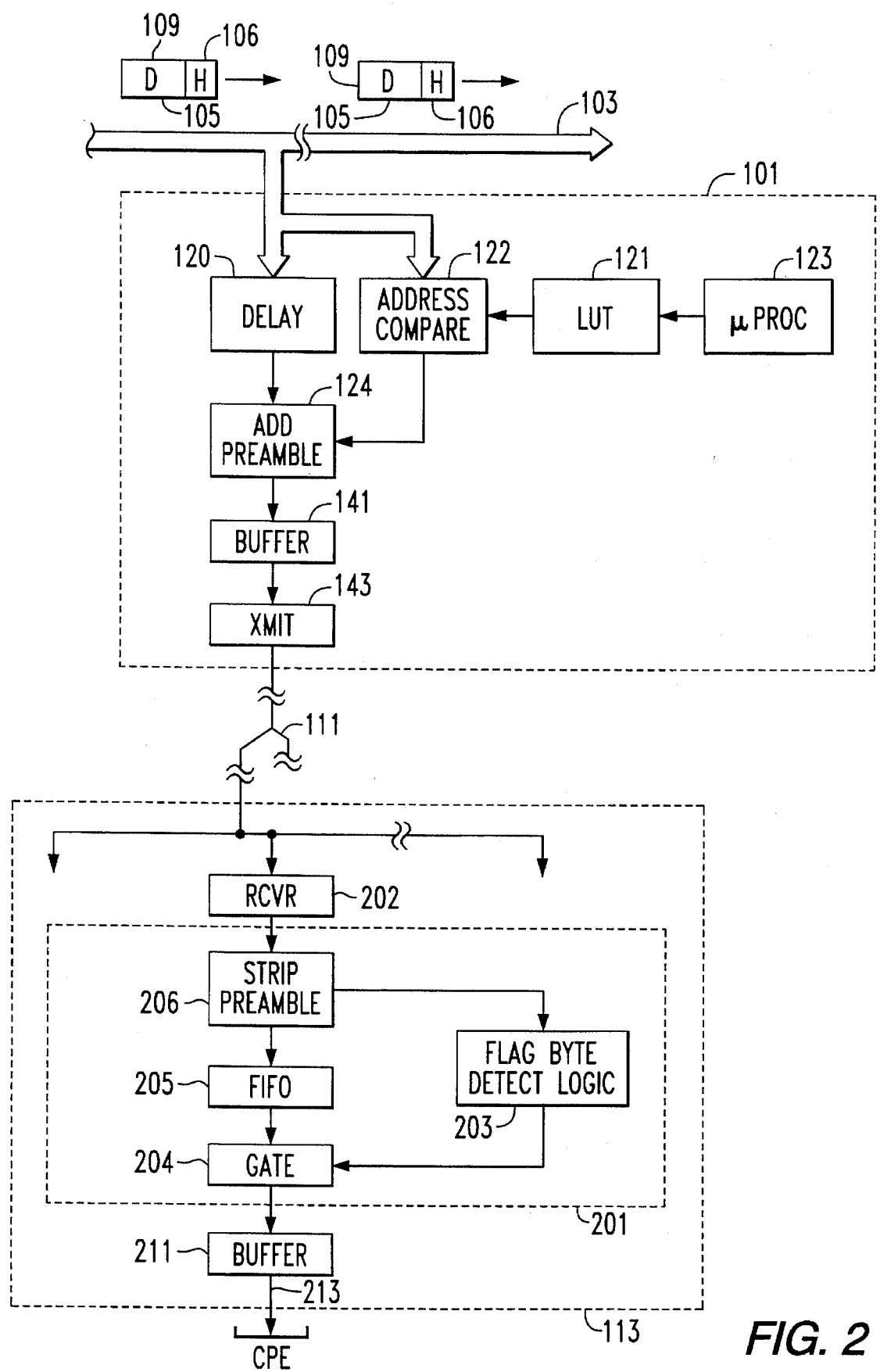
FIG. 2 diagrammatically illustrates an embodiment of the flag field-based ATM cell router of the present invention.

The ATM routing scheme of the present invention is diagrammatically illustrated in FIG. 2 as comprising a two stage 'routing filter' arrangement, having a first (upstream) routing filter stage, a respective one of which is shown at 101, coupled to the high speed serial bus 103 of the host digital terminal's backplane, over which successive ATM cells 105 are serially transmitted. As detailed in the above-referenced '247 application, and as diagrammatically illustrated in FIG. 2, each ATM cell 105 includes a header portion 106 and a payload or data portion 109. Pre-inserted to each ATM cell is a flag field 107. The second routing filter stage of the two stage routing filter arrangement resides in a downstream optical network unit (ONU) 113, as will be described.

A respective upstream routing filter stage 101 is coupled in the data transport path from the host digital terminal's backplane to an optical fiber 111 serving a plurality of customer sites, and is comprised of a delay stage 120, a look-up table (LUT) 121 and an associated comparator mechanism 122 that is loaded by an attendant microprocessor 123. The LUT 121 has a number of entries sufficient to accommodate the number of channels simultaneously delivered to customer premises served by the optical fiber 111. As a non-limiting example, LUT 121 may include 128 entries, respectively associated with 64customer premises.

Whenever customer premises channel selection devices (e.g. television set top boxes) request a channel change, the entries of the LUT 121 are selectively loaded by the host terminal's processor 123 with the address of the channel and the customer premises address. Then, as successive ATM cells 105 are asserted onto the bus 103, the address portion of the header 106 of an ATM cell 105 is compared by channel address comparator mechanism 122 with the addresses that have been written into the LUT 121, in order to determine which customer premises have requested the channel (ATM cell) being examined. When a match is found, a prescribed one of the flag bits of a flag field portion of an ATM cell preamble 107 to a given binary state (e.g. a '1' bit if a match is found). The preamble 107 is pre-inserted to the ATM cell by an adder preamble mechanism (preamble inserter) 124.

More particularly, as shown in FIG. 3, the code width or number of bits of the flag field portion 133 of the ATM cell preamble 107 corresponds to the number of customer premises (64, in the present example) capable of being served at downstream ends of optical fiber link 111. The location of each flag bit fbi in the flag field 107 corresponds to a respective one of a plurality of customer premises. Thus, to accommodate sixty-four customer sites in the present example, the flag field 107 is at least 64 bits wide.

As described above, the state of each bit fbi of the flag field of an ATM cell preamble 107 will indicate whether or not that ATM cell 105 is intended for the customer premises associated with the flag bit. Therefore, for any customer premise not requesting a given channel (ATM cell), the customer premise's associated bit position in the flag field of that channel's ATM cell preamble will be set to a first binary state (e.g. zero). However, for any customer premises that has requested a given channel or ATM cell, the customer's associated bit position in the flag field of that channel's ATM cell preamble will be set to a second binary state (e.g. one).

As successive ATM cells 105 are asserted onto the backplane and examined as described above, and flag bits associated with channel requests selectively set (to a '1') in the manner described above, the processed ATM cells 105 are coupled through a rate-matching elastic buffer 141, and serialized out therefrom via transmission equipment 143 over the optical fiber 111 to downstream customer premises equipments served by ONU 113, which terminates the fiber 111.

The second routing filter stage of the two stage routing filter arrangement of the present invention is shown in FIG. 2 as residing in the optical network unit (ONU) 113, at the downstream end of the optical fiber 111. In particular, the downstream optical network unit (ONU) 113 associated with one or more customer premises contains an associated set of one or more customer associated cell filters 201 that are coupled to the receiver 202 terminating the optical fiber 111. Each cell filter 201 effectively operates as a slave to the upstream routing filter 101, and may include a preamble extractor 206 coupled to a first-in, first-out (FIFO) register 205, the contents of which are coupled to an associated logic circuit-configured flag bit detector 203, which examines a given bit position in the cell filter register associated with that customer position.

Namely, as described earlier, the flag bit detector 203 of a respective cell filter 201 looks to see whether the flag field bit associated with its associated customer premises equipment is set to prescribed bit value (e.g. a '1')—indicating a customer channel request. If the flag bit is set (a '1' bit), flag bit detector 203 generates an enabling signal to a throughput control gate 204 at the serial output port of the preamble extractor 206, so that the received ATM cell is allowed to pass through the cell filter, and is coupled through a rate matching buffer 211 to an output port 213 for delivery to the customer premises equipment (e.g. television set top box).

If the flag bit is not set, indicating no customer channel request for that ATM cell, the throughput control gate 204 at the serial output port of the cell filter register is disabled during the clocking out of the ATM cell, so that the ATM cell is not allowed to pass from the cell filter 201 to the customer premises equipment. In other words, since all of the routing information required for cell delivery to a requesting piece of equipment is contained in a single flag bit position, it is unnecessary to examine the ATM cell address, thereby simplifying the ATM cell decoding mechanism.

As will be appreciated from the foregoing description, the present invention provides a reduced complexity two-stage cell routing filter mechanism, which employs a customer premises associated flag bit field that is readily added to the ATM data cells of the communication scheme described in the above-referenced '984 application, so as to both obviate the need for an N×M multiplexer and associated steering control circuitry therefor, and to reduce its redundancy of operation and therefore increase the available bandwidth usage of the link.

The first portion of the routing filter mechanism disposed in the host digital terminal's data transport path to the optical fiber is comprised of a look-up table (LUT) and an associated comparator mechanism. The state of each bit of the flag field preamble to an ATM cell will indicate whether or not the ATM cell is intended for the customer premises associated with the bit. Therefore, for any customer premises not requesting a given channel, the customer's associated bit position in the flag field preamble to that channel's ATM cell will be set to a first binary state (e.g. zero). On the other hand, for any customer premises that has requested the channel, the customer's associated bit in the flag field preamble to the channel's ATM cell will be set to a second binary state (e.g. one).

A downstream optical network unit contains an associated set of ATM cell filters associated with customer premises. Advantageously, each customer cell filter needs only to examine a given bit position in the flag field preamble to each received ATM cell, to see whether the flag bit of the preamble of received ATM cell is set to prescribed bit value (e.g. one)—indicating a customer channel request.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A method of conveying telecommunication messages over a communication path from a master site to customer premises equipment coupled to a plurality of remote sites comprising the steps of:

at said master site, (a) examining a respective data cell having a header and payload, said payload containing data to be conveyed to one or more customer premises of said remote sites, in order to determine which customer premises have requested said respective data cell;

(b) assembling said telecommunication messages as data cells, each data cell having a multibit flag field pre-inserted to said header, such that each bit of said multibit flag field is set to a prescribed bit value associated with customer premises of a remote site requesting said respective data cell;

(c) transmitting said respective data cell assembled in accordance with step (b) to said plurality of remote sites; and at a respective one of said plurality of remote sites, (d) extracting said multibit flag field of a respective data cell that has been transmitted thereto in step (c), and examining the contents of the extracted multibit flag field in order to determine whether the bit of said flag field associated with customer premises of said respective one of said plurality of remote sites has been set to said prescribed bit value, and forwarding said respective data cell absent said flag field to a customer premises, if the bit of said flag field associated with customer premises of said respective one of said plurality of remote sites has been set to said prescribed bit value, but otherwise not forwarding said respective data cell to said customer premises.

2. A method according to claim 1, wherein said telecommunication messages are asynchronous transfer mode data cells.

3. A method according to claim 2, wherein said data cell contains an identification code, and wherein step (a) comprises comparing the identification code of said respective data cell with a list of identification codes destined for remote site customer premises to associate said respective data cell with those customer premises that have requested said respective data cell and setting, to said prescribed bit value, each bit of said multibit flag field that is associated with a remote site customer premises requesting said respective data cell.

4. A method according to claim 3, wherein said list of identification codes of cells destined for remote site customer premises is stored in a look-up table.

5. A system for conveying telecommunication messages over a communication path from a host terminal device of a master site to customer premises equipment located at one or more remote sites, said system comprising:

a data cell preamble assembly mechanism installed in said host terminal device and being operative to assemble said telecommunication messages as data cells, each data cell having a payload portion containing data to be conveyed to customer premises equipment located at said one or more customer remote sites, a header section identify the cell, and a preamble portion, said preamble portion including a multibit flag field having a code width sufficient to accommodate the number of remote site customer premises;

a data cell router which compares information contained within a respective data cell header with a list of entries associated with customer premises at said remote sites, in order to determine which customer premises have requested said respective data cell and setting, to a prescribed bit value, each bit of said multibit flag field of the preamble that is associated with a remote site customer premises requesting said respective data cell;

a transmitter which transmits said respective data cell processed by said data cell router over said communication path to said one or more remote sites; and a receiver at a respective remote site which receives data cells transmitted over said communication path from said transmitter; and a data cell filter, which is coupled to said receiver and examines the flag field of a respective data cell preamble that has been transmitted thereto, in order to determine whether the bit of said flag field associated with a customer premises served by said respective remote site has been set to said prescribed bit value, and forwarding said respective data cell to said customer premises in response to said bit having been set to said prescribed bit value, but otherwise not forwarding said respective data cell to said customer premises.

6. A system according to claim 5, wherein said header portion of a respective data cell contains an identification code, and wherein said data cell router is operative to compare the identification code of a respective data cell with a list of identification codes destined for remote site customer premises in order to associate said respective data cell with those customer premises that have requested said respective data cell, and to set, to said prescribed bit value, each bit of said multibit flag field that is associated with a remote site customer premises requesting said respective data cell.

7. A system according to claim 6, wherein said list of identification codes is stored in a look-up table.

8. A two-stage cell routing filter arrangement that includes a customer premises associated flag bit field contained in data cells serially transmitted from a host digital terminal's data transport path through a communication link to a receiving unit associated with a plurality of customer premises, said two stage cell routing filter arrangement comprising a first filter stage comprised of a look-up table and an associated comparator mechanism, and wherein the logical state of each bit of a flag field of a cell preamble indicates whether or not the cell is intended for the customer premises associated with the bit, said receiving unit containing a second stage that includes a set of cell filters associated with customer premises equipment, each customer premises cell filter being operative to examine a given bit position in the flag field portion of each received cell preamble, to determine whether the flag field bit of the preamble of the cell is set to prescribed bit value, indicating a customer channel request.

* * * * *